United States Patent [19]
Chesnutt

[11] Patent Number: 5,966,081
[45] Date of Patent: Oct. 12, 1999

[54] PAGING ACTIVATED ELECTRONIC SECURITY SYSTEM

[76] Inventor: R. Van Chesnutt, 7250 Old Redmond Rd., #147, Redmond, Wash. 98052

[21] Appl. No.: 08/937,058

[22] Filed: Sep. 24, 1997

[51] Int. Cl.$^6$ .................................................. G06F 7/04
[52] U.S. Cl. .......................... 340/825.31; 340/825.34; 340/825.44; 307/10.3; 307/10.5; 307/10.7
[58] Field of Search ................................ 307/10.1, 10.3, 307/10.4, 10.5, 10.6, 10.7; 340/825.31, 825.34, 825.44, 539; 455/343, 38.2; 395/200.3

[56] References Cited

U.S. PATENT DOCUMENTS

| | | |
|---|---|---|
| 4,208,630 | 6/1980 | Martinez . |
| 4,759,062 | 7/1988 | Traub et al. . |
| 4,962,522 | 10/1990 | Marian . |
| 5,043,721 | 8/1991 | May . |
| 5,073,767 | 12/1991 | Holmes et al. . |
| 5,081,667 | 1/1992 | Drori et al. . |
| 5,113,427 | 5/1992 | Ryoichi et al. . |
| 5,276,728 | 1/1994 | Pagliaroli et al. . |
| 5,331,317 | 7/1994 | Davis . |
| 5,337,044 | 8/1994 | Folger et al. . |
| 5,430,892 | 7/1995 | Motegi . |
| 5,440,559 | 8/1995 | Gaskill . |
| 5,479,157 | 12/1995 | Suman et al. . |
| 5,510,778 | 4/1996 | Krieter et al. . |
| 5,764,892 | 6/1998 | Cain et al. ........................... 395/200.3 |

*Primary Examiner*—Michael Horabik
*Assistant Examiner*—Jean B. Jeanglaude
*Attorney, Agent, or Firm*—Christensen O'Connor Johnson & Kindness PLLC

[57] ABSTRACT

An antitheft system for use in portable consumer electronic equipment. The antitheft system includes an antitheft receiver that receives a deactivation code that is transmitted by a paging system transmitted when the device is reported stolen. Upon receipt of the deactivation code, a microprocessor within the electronic equipment causes the equipment to become inoperative. To ensure the antitheft receiver is not removed or tampered with, the microprocessor queries the antitheft receiver for a unique identification number associated with the device. If the identification number does not match a number that is stored within the equipment, the equipment assumes the antitheft receiver has been tampered with and causes the equipment to become inoperative

5 Claims, 3 Drawing Sheets

PAGING ACTIVATED ELECTRONIC SECURITY SYSTEM

FIELD OF THE INVENTION

The present invention relates to antitheft systems, in particular to antitheft systems for use in electronic devices that include a central processing unit.

BACKGROUND OF THE INVENTION

As the cost of consumer electronic devices such as computers increases, there is a greater likelihood that these devices will be stolen. As a result, numerous antitheft systems have been proposed. For example, many portable computer systems can be connected to cables or other such locking mechanisms that prevent their unauthorized removal. While such systems work well to discourage thefts, they are generally cumbersome and unsightly. In addition, if the cables that secure a device are cut, the device will operate normally, thereby providing an incentive for the attempted theft of such devices.

Alternative antitheft systems generally employ an electronic password that must be entered by a user before the device will operate properly. However, such systems have not gained widespread acceptance because the user must remember the password, share the passwords with other operators of the device, and must remember to enable the antitheft system each time the device is left unattended.

A new type of antitheft system, which has been suggested for automobiles allows a user to electronically disable a stolen automobile through the use of a cellular telephone call. The call transmits a digital code which is received by the automobile causing it to become inoperative. Such systems, however, are generally too expensive to be incorporated into consumer electronic equipment, have a limited range in which they can be activated, and are subject to tampering or other attempts to disable the system.

Given the high cost of consumer electronic equipment and the frequency with which such equipment is stolen, there is a need for a low cost antitheft system that can render the equipment inoperative if stolen. The system should have a wide activation area and be tamper-proof

SUMMARY OF THE INVENTION

To solve the problems associated with prior art antitheft devices, the present invention comprises an integrated paging-based antitheft device. Upon notification that the equipment in which the device is stored has been stolen, a paging signal is transmitted that contains a numeric deactivation code. The antitheft device receives the deactivation code and causes the equipment to become inoperative.

To ensure that the antitheft device is not tampered with, the device is incorporated into the Power-On Self-Test (POST) processing sequence which runs in the Basic Input Output System (BIOS) memory of the equipment in such a way that, if the device is removed, the equipment becomes inoperative. By integrating the device into the electronic equipment's POST processing circuitry, the device may be easily integrated into current manufacturing operations with minimal or no disruptions. Furthermore, the antitheft device queries a non-volatile random access memory (which may be NVRAM) location outside of the device itself for a unique identification number/code. If the number received does not match an expected number that is the number stored in the antitheft device's own non-volatile memory, then tampering has occurred. Attempts to tamper with the antitheft device, such as attempting to replace the device, will cause equipment to become inoperative.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is an antitheft system that can render electronic equipment or electronically controlled equipment inoperative over a wide geographic area. In addition, the antitheft system is resistant to attempts to tamper with or bypass the system.

Figure 1:
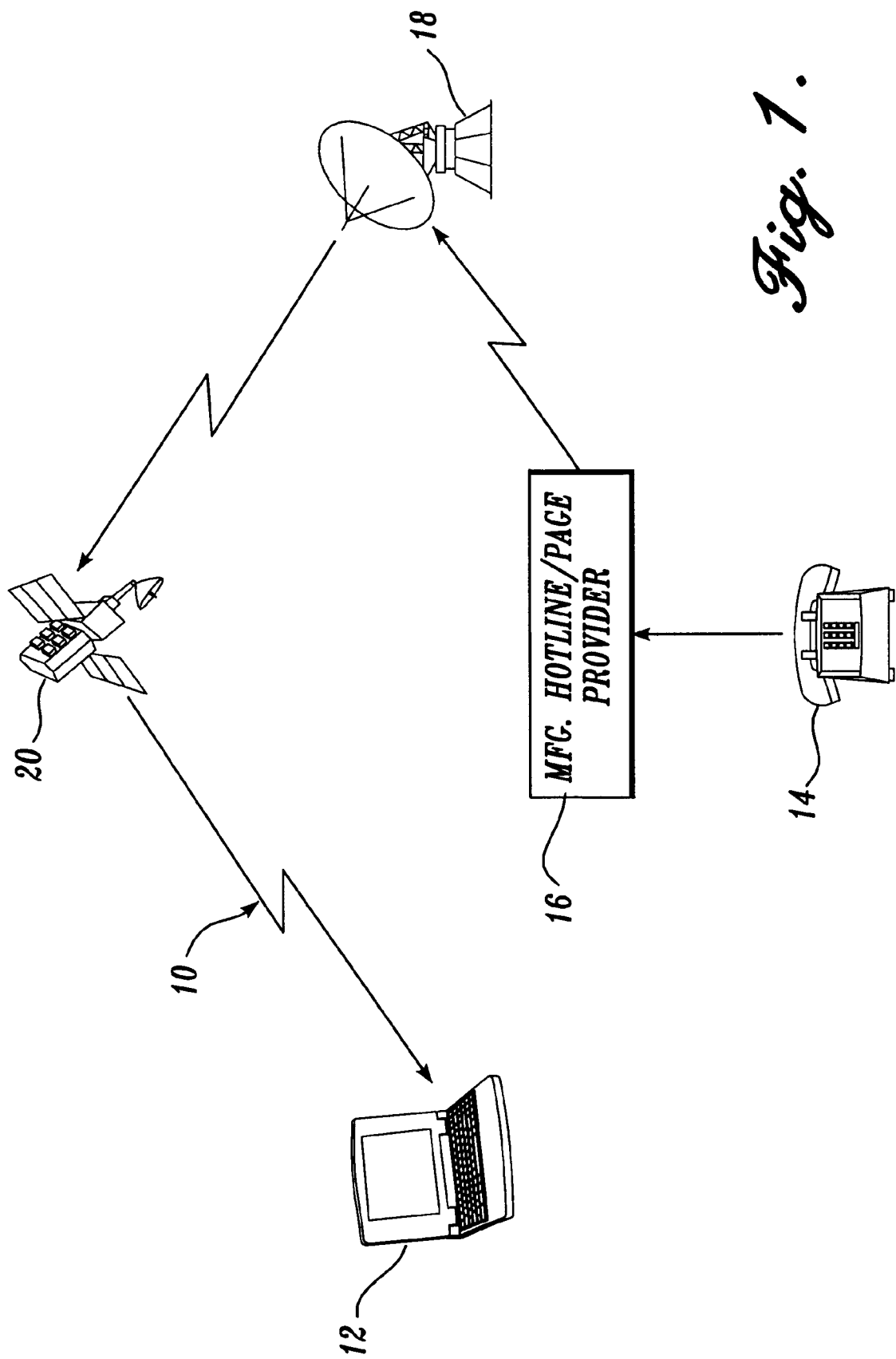
FIG. 1 is a functional diagram of an antitheft system according to the present invention.

FIG. 1 is a functional block diagram of an antitheft system 10 that is constructed according to the present invention. The antitheft system 10 is designed to render a consumer electronic device, such as a desktop computer, laptop computer, audio/video component, television, or other device that is controlled by a microprocessor, inoperable if stolen. In the example shown, a laptop computer 12 is equipped with an antitheft device that disables the computer inoperative if stolen. Upon discovering that the laptop computer has been stolen, the owner of the equipment uses a telephone 14 to call a manufacturer or other coordination center 16. The owner provides the manufacturer with some proof that they are the legitimate owner of the stolen laptop computer 12. Upon confirming the owner's identity, the manufacturer or coordination center 16 initiates or calls a paging service provider to broadcast a digital deactivation code from one or more paging transmitters 18. These transmitters may be ground-based transmitters or may be satellite transmitters which cause the deactivation code to be broadcast over a wide geographic area from an overhead satellite 20. The antitheft device within the stolen laptop computer 12 receives the deactivation code and causes the laptop to become inoperative.

The deactivation code that is transmitted is preferably at least 64 bytes long so that the system can accommodate an extremely large number of devices each with its own deactivation code. The code may very well include some redundancy and/or error checking to ensure that no errors occur in transmission. The deactivation code will require only a narrow bandwidth because a great number of devices can receive on the same frequency but only respond to their own unique number. Because the paging transmitters operate at a relatively high power and transmit in simulcast, large geographic areas can be covered to ensure that the stolen equipment receives the deactivation code.

Figure 2:
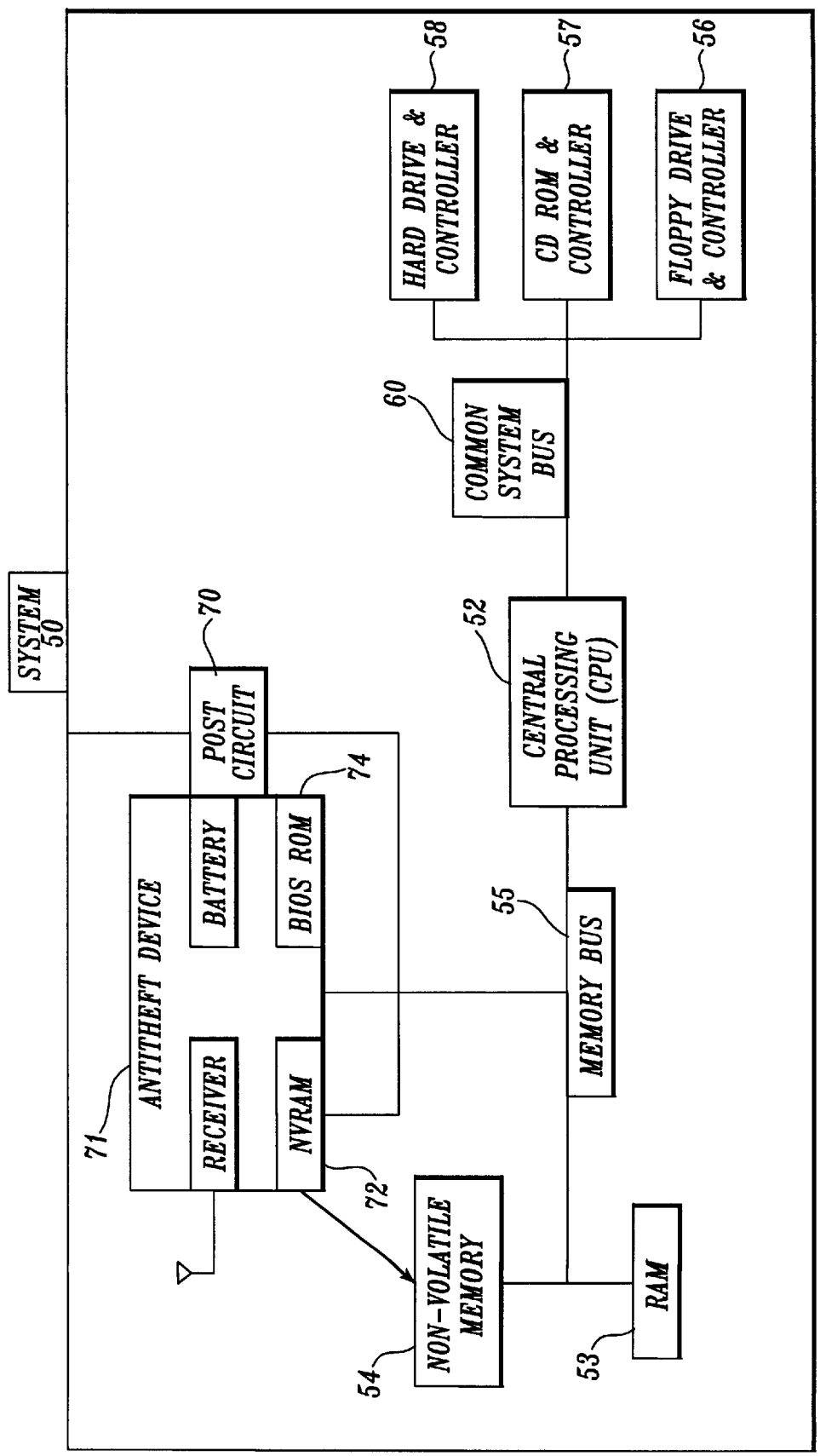
FIG. 2 is a block diagram of a computer system equipped with an antitheft system according to the present invention.

FIG. 2 is a block diagram of a computer system that includes an antitheft receiver according to the present invention. The computer system 50 includes a central processing unit (CPU) 52, a random access memory (RAM) 53, a non-volatile memory (NVRAM) 54, and a number of peripherals including a floppy disk drive and controller 56, a CD-ROM drive and controller 57 and a hard disk drive and controller 58. The central processing unit 52 and the disk drives 56, 57 and 58 are connected via a common data bus 60 while the system RAM 53, NVRAM 54 and the antitheft device are connected via a memory bus 55. Included with the computer system, but not shown is a keyboard, a pointing device such as a mouse, and a display screen.

Also included in the computer system 50 is the Power-On Self-Test (POST) processing circuit 70. The POST circuit is an integral part of the start-up power-on process of the computer. Its purpose is to verify that the power and electronic components within the computer system are "good" and functioning normally. If the POST detects "bad" or failed electronic components, the system fails to boot and the user is informed via an on-screen message that a problem exists. An antitheft device 71 is incorporated into or onto this POST circuit 70. If either the POST circuit 70 is removed, or the antitheft device 71 is removed from the POST circuit, the computer system is incomplete and will not function.

The antitheft device 71 includes a paging receiver that receives the digital deactivation code that is broadcast when the owner reports the computer as stolen. If the computer is in a power on mode (turned on) when a deactivation code is received an interrupt is sent to the CPU 52 causing a re-boot which re-initiates the system check performed by the POST circuit 70. During this process, a problem is detected because the antitheft device 71 is programmed not to return a proper identification number/code, after it has received a valid deactivation code. If the computer is off when a deactivation code is received, the antitheft device 71 simply receives the deactivation code and "trips" an internal programmable switch or changes the state of a non-volatile memory cell. As a result, when the computer is turned on and the POST process is initiated, the state of the switch is checked by the antitheft device, to determine whether a deactivation code was received. If so, the antitheft device will advise the POST circuit that an error has occurred and an element is "bad." Then the POST will generate an error and the computer system will not operate.

Based on the manufacturer's desires, it is possible that the receipt of a deactivation code could cause a lock up operation to perform on the system components such as the drives 56, 57, 58 or the disabling of the RAM memory 53. In addition, again at the discretion of the manufacturer, the computer may display a message on the screen indicating that its operation has been disabled because the system was reported stolen.

The antitheft device 71 is designed to be tamper resistant such that if a thief attempts to remove or alter the antitheft device, the POST circuit 70 will detect this fact, and recognize that the computer 50 has most likely been stolen and will thus not operate. Tampering protection is accomplished in several ways. First, because the antitheft device 71 is incorporated into the POST processing circuit 70, it is highly unlikely that either could be removed without damaging the primary circuit board of the computer system and rendering the system unusable. Secondly, the system will not operate, or boot-up even with a floppy, if the POST processing circuit is not present, and the POST process will not operate if the antitheft device 71 is not part of it because of mutual interoperability. Third, part of the antitheft device's own processing (to provide a "good" response in the POST process) is to validate itself by reading a code or identification number that is stored in the non-volatile random access memory (NVRAM 54. If an incorrect code or identification number is detected or no code is detected at all, then tampering has occurred and the POST circuit will prevent the computer system from powering up. This test is initiated only if the deactivation code had not been detected. If all tests are passed, then the computer system operates normally.

Primary power for the antitheft device 71 is from the main system 50 battery (as is the CPU's clock). However, certain embodiments of the device may include a small, integrated rechargeable power source (battery) which is maintained from the primary power source. Because the paging receiver within the antitheft device is always powered, it is capable of receiving a deactivation code even when the computer system is turned off. Even if a complete power drain occurs, the state of the antitheft device will not be altered because the antitheft device registers the receipt of a deactivation code by changing the state of a non-volatile memory location which is not affected by power loss as described above.

Figure 3:
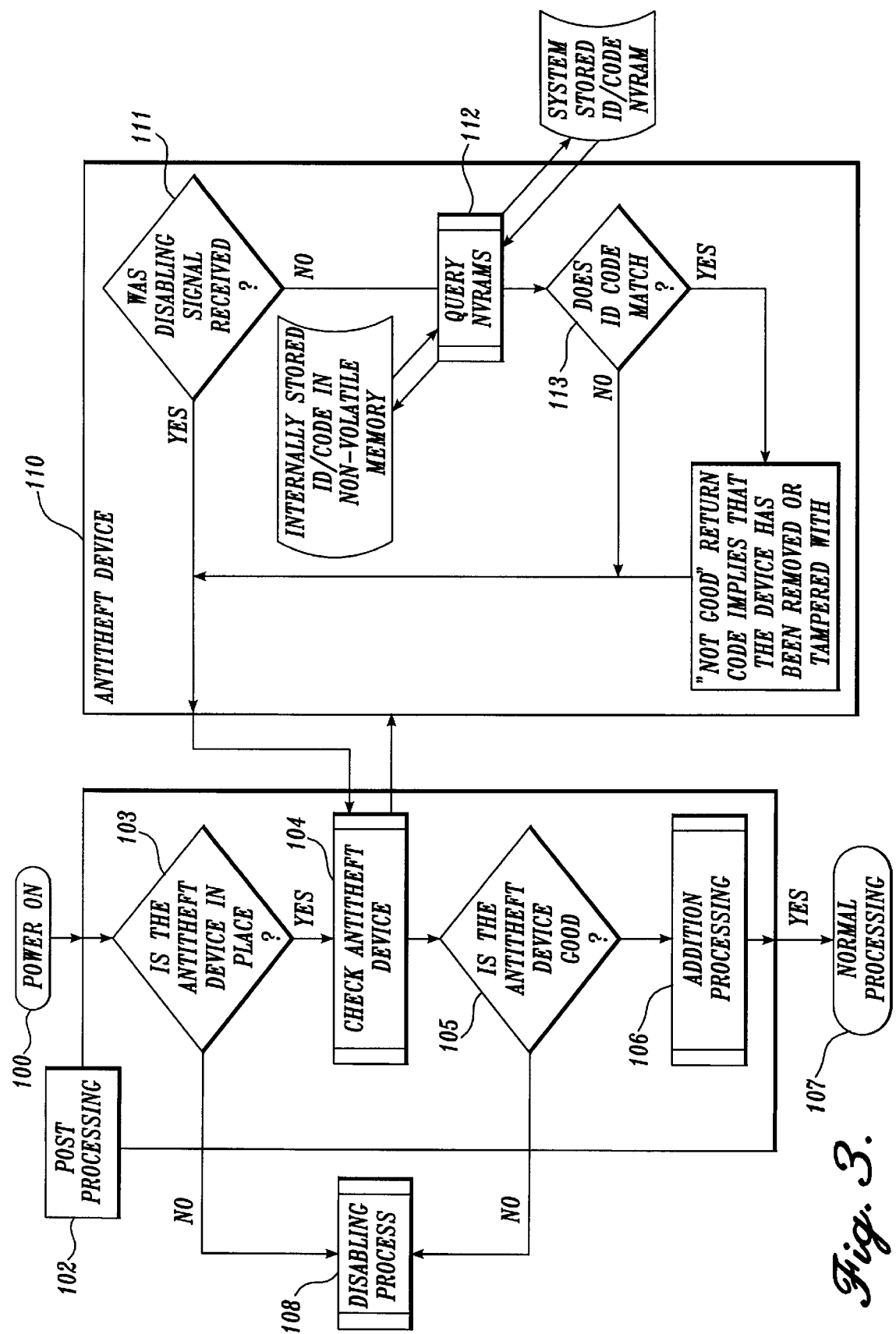
FIG. 3 is a flowchart showing the steps performed by the antitheft system according to the present invention.

FIG. 3 is a flowchart of the steps performed by the antitheft device according to the present invention. Beginning with a step 100, the power is applied to the electronic equipment that includes the antitheft device. At step 102, the POST process commences, part of which is the testing as to whether or not the antitheft device is in place at a step 103. If it is, the state of the antitheft device must be determined, that is, whether or not the antitheft device is "good" or not at a step 104. In this step, the antitheft device itself checks the state of the programmable switch or memory location to determine if a deactivation code has been received at a step 111. If so, a "not good" answer is returned to the controlling POST process. If no deactivation code has been received, the antitheft device queries the system NVRAM to obtain the identification code stored there. If the identification code is what was expected, in other words, if it matches the device's own internally stored code, a "good" answer is returned to the POST at a step 113. The initial setup of the identification number/code in the equipment system's non-volatile memory will occur when the equipment is first installed and powered up for the first time by the manufacturer. This code, which is to be identical to the code in the antitheft device, will in essence lock or mate the antitheft to the equipment it is installed in.

If the POST circuit receives a "good" result from the antitheft device, it processes its other tasks at a step 106 before allowing the system to start normally at a step 107. If at any time, the BIOS receives a "not good" answer from the antitheft device, then it is assumed that either a deactivation code has been received or the antitheft device has been tampered with and startup is aborted at a step 108.

Once a system has been rendered inoperable, it may be reset by a re-enabling code being received by the paging receiver within antitheft device, by sending the equipment back to the manufacturer or their representative, or if the software allows by entering a password. (The former is preferable.) Once a device has been reset, it will operate normally.

The inclusion of the antitheft device in any electronic equipment is not expected to cause any substantial re-definition of the manufacturing process. The antitheft device will be integrated as a component of any electronically controlled system in which it is installed.

As can be seen from the above, the present invention is an antitheft device that operates over a wide geographic area. Because paging systems, in particular, satellite paging systems, can broadcast over wide areas, the deactivation code which indicates a device has been stolen will more likely reach the stolen equipment. In addition, because the electronic equipment queries the antitheft receiver to determine its unique identification number, the device is more resilient to tampering.

Although the present invention has been described with respect to computer systems, those skilled in the art will recognize that it could also be used in other types of equipment such as audiovisual equipment or motorized vehicles. Obviously, in the case of motorized vehicles, the vehicle should not be made to shut down immediately upon receipt of the code that indicates the vehicle has been stolen, but may wait until the next time the vehicle is shut off before disabling the ignition. In addition, the present invention could be incorporated into sensitive military equipment to prevent it from falling into the wrong hands.

Therefore, while the preferred embodiment of the invention has been illustrated and described, it will be appreciated that various changes can be made therein without departing from the spirit and scope of the invention. The scope of the invention is to be determined by the following claims and equivalents thereof.

The embodiments of the invention in which an exclusive property or privilege is claimed are defined as follows:

1. An antitheft system for incorporation into electronic equipment to disable the equipment if stolen, wherein the equipment includes a power-on self test (POST) processing circuit that executes a POST routine when activation power is applied to the electronic equipment, comprising:

a paging receiver that receives a paging signal that uniquely identifies the electronic equipment which is broadcast when the electronic equipment is discovered to be stolen, the paging receiver setting an internal condition within the antitheft system upon receipt of the paging signal that indicates that the equipment has been stolen. the POST processing circuit executing instructions that interact with the antitheft system to determine if the internal condition indicates that the equipment has been stolen, and if so, causing an error in the POST routine such that the equipment fails to boot, thus disabling the electronic equipment.

2. The antitheft system of claim 1, wherein as part of the POST routine, the POST processing circuit executes a sequence of instructions that cause the antitheft system to compare an internally stored code with a code stored in a non-volatile memory location within the electronic equipment and if the internally stored code does not match the code stored in the non-volatile memory, causes an error condition to be returned to the POST routine that prohibits the electronic equipment from booting, thus disabling the equipment.

3. The antitheft system of claim 1, wherein the electronic equipment is a portable computer.

4. The antitheft system of claim 1, wherein the electronic equipment is a motorized vehicle.

5. The antitheft system of claim 1, wherein the electronic equipment is military equipment.

* * * * *